US008570619B2

(12) United States Patent
Kaigawa

(10) Patent No.: US 8,570,619 B2
(45) Date of Patent: Oct. 29, 2013

(54) CONTROL DEVICES FOR SCANNING DOCUMENTS, SYSTEMS INCLUDING SUCH CONTROL DEVICES, AND NON-TRANSITORY, COMPUTER-READABLE MEDIA STORING INSTRUCTIONS FOR SUCH CONTROL DEVICES

(75) Inventor: Shinsuke Kaigawa, Kitanagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 99 days.

(21) Appl. No.: 13/420,905

(22) Filed: Mar. 15, 2012

(65) Prior Publication Data

US 2012/0236377 A1 Sep. 20, 2012

(30) Foreign Application Priority Data

Mar. 18, 2011 (JP) .................................. 2011-060591

(51) Int. Cl.
*H04N 1/04* (2006.01)
(52) U.S. Cl.
USPC ........................... 358/474; 358/1.15; 709/206
(58) Field of Classification Search
USPC ......... 358/1.15, 474, 501, 505; 709/201, 202, 709/206
See application file for complete search history.

(56) References Cited

U.S. PATENT DOCUMENTS

| | | | | |
|---|---|---|---|---|
| 5,784,622 A * | 7/1998 | Kalwitz et al. | ................. | 710/200 |
| 5,917,965 A * | 6/1999 | Cahill et al. | ................... | 382/305 |
| 5,930,801 A * | 7/1999 | Falkenhainer et al. | ............... | 1/1 |
| 6,862,603 B1 * | 3/2005 | Nakajima et al. | ..................... | 1/1 |
| 6,973,618 B2 * | 12/2005 | Shaughnessy et al. | ........ | 715/239 |
| 7,133,141 B1 * | 11/2006 | Abi-Saleh | ..................... | 358/1.13 |
| 7,301,658 B2 * | 11/2007 | Henry | .......................... | 358/1.15 |
| 7,325,095 B2 * | 1/2008 | Williams | ....................... | 711/112 |
| 7,593,046 B2 * | 9/2009 | Yoshida et al. | ............... | 348/246 |
| 8,014,013 B2 * | 9/2011 | Owen et al. | .................. | 358/1.15 |
| 8,379,272 B2 * | 2/2013 | Minato | ........................ | 358/3.07 |
| 8,412,692 B2 * | 4/2013 | Lee | ............................... | 707/705 |
| 2008/0098356 A1 | 4/2008 | Ericsson et al. | | |

FOREIGN PATENT DOCUMENTS

| | | | |
|---|---|---|---|
| JP | 2002-176564 A | | 6/2002 |
| JP | 2004-280654 A | | 10/2004 |
| JP | 2007-310775 A | | 11/2007 |
| JP | 2008-097136 A | | 4/2008 |
| JP | 2008-112439 A | | 5/2008 |
| JP | 2008-282095 A | | 11/2008 |

* cited by examiner

*Primary Examiner* — Negussie Worku
(74) *Attorney, Agent, or Firm* — Baker Botts L.L.P.

(57) ABSTRACT

A system including a reading device that reads an image from a document and a control device that controls the reading device is disclosed herein. The control device includes a processor and a memory storing computer-readable instructions. The computer-readable instructions instruct the processor to determine whether a read image read by the reading device comprises a table image. The computer-readable instructions instruct the processor to generate a first file in a first file format when the processor determines that the read image comprises the table image. The computer-readable instructions instruct the processor to generate a second file in a second file format when the processor determines that the read image does not comprise the table image. The second file is different from the first file. The second file format is different from the first file format. Computer-readable media storing the computer-readable instructions and corresponding methods also are disclosed herein.

13 Claims, 7 Drawing Sheets

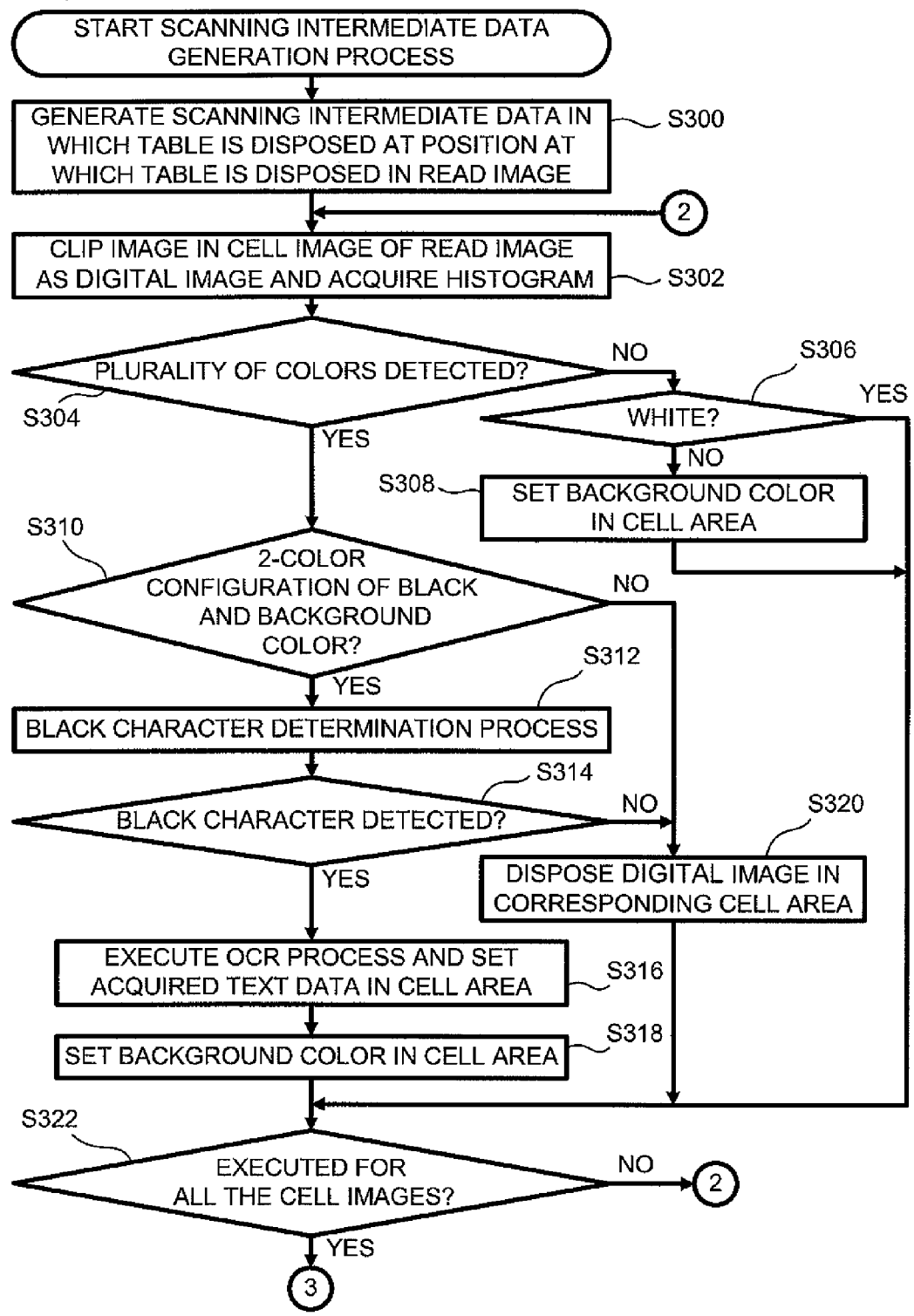

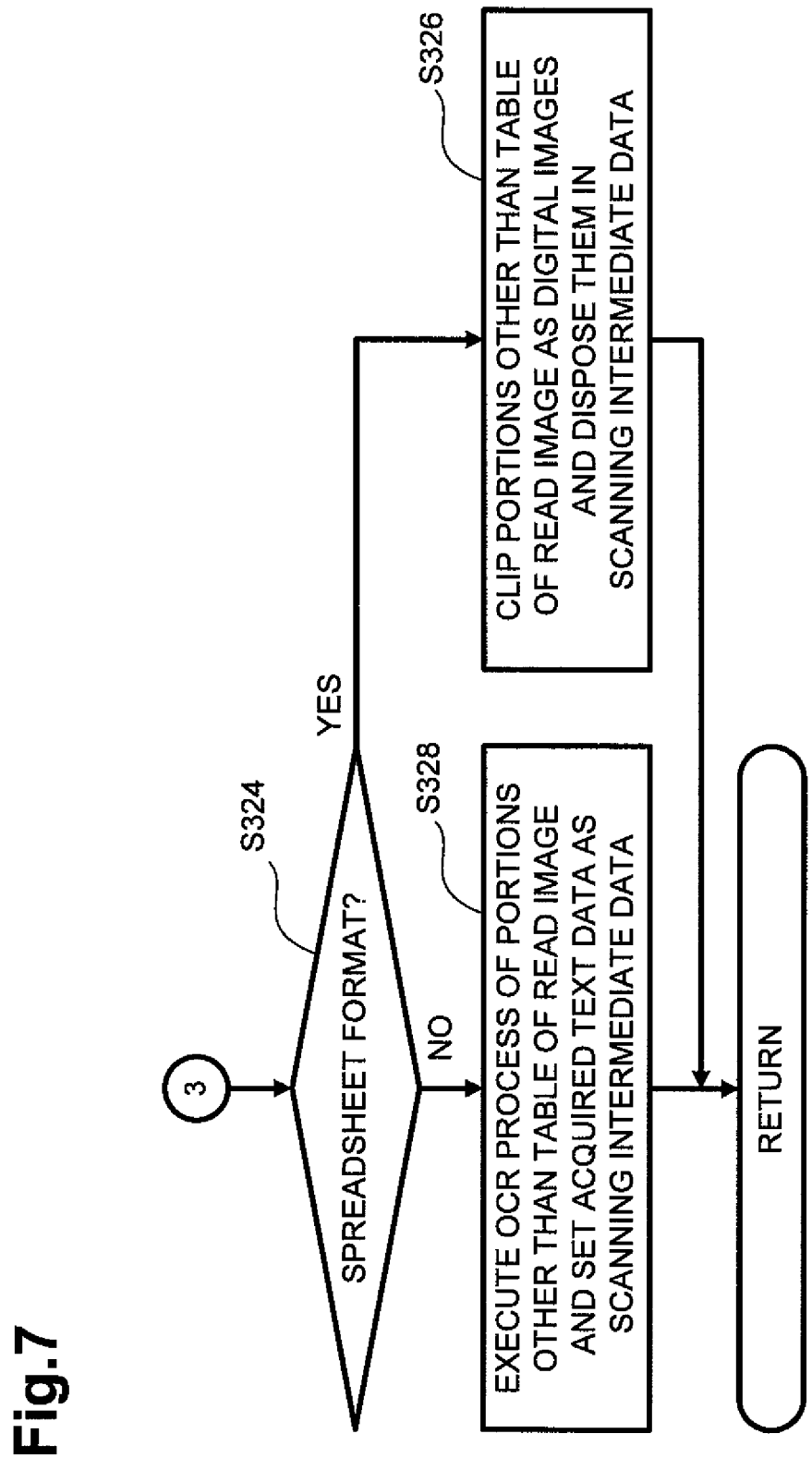

CONTROL DEVICES FOR SCANNING DOCUMENTS, SYSTEMS INCLUDING SUCH CONTROL DEVICES, AND NON-TRANSITORY, COMPUTER-READABLE MEDIA STORING INSTRUCTIONS FOR SUCH CONTROL DEVICES

INTERSECT-REFERENCE TO RELATED APPLICATION

The present application claims priority from Japanese Patent Application No. 2011-060591, filed on Mar. 18, 2011, which is incorporated herein by reference.

BACKGROUND OF THE INVENTION

1. Field of the Invention

The invention relates to control devices and computer-readable media comprising computer-readable instructions for control devices. More specifically, the invention relates to reading documents and generating files corresponding to the read documents.

2. Description of the Related Art

Software for use in an optical character recognition ("OCR") process exists. Known OCR software scans an original table, recognizes the table by recognizing vertical and horizontal lines, and generates an electronic file in a table compilation software format. The known technology and software generates an electronic file in a single file format, such as a table compilation format.

SUMMARY OF THE INVENTION

A need has arisen to provide control devices and computer-readable media comprising computer-readable instructions for control devices for generating files in various formats based on characteristics of images read from scanned documents.

A system disclosed herein may comprise a reading device and a control device. The reading device may be configured to read an image from a document. The control device may be configured to control the reading device, and the control device may comprise a processor and a memory. The memory may be configured to store computer-readable instructions therein. The computer-readable instructions may instruct the processor to perform a function of determining whether a read image read by the reading device comprises a table image comprising a plurality of cell images arranged in one or more of rows and columns. The computer-readable instructions may instruct the processor to perform a function of generating a first file, which corresponds to the read image, in a first file format when the processor determines that the read image comprises the table image. The computer-readable instructions may instruct the processor to perform a function of generating a second file, which corresponds to the read image, in a second file format when the processor determines that the read image does not comprise the table image. The second file may be different from the first file. The second file format may be different from the first file format.

A non-transitory, computer-readable storage medium disclosed herein may store computer-readable instructions therein. The computer-readable instructions may be executable by a processor of a control device configured to control a reading device, which is configured to read a document. The computer-readable instructions may instruct the processor to execute a function of determining whether a read image comprises a table image comprising a plurality of cell images arranged in one or more of rows and columns. The computer-readable instructions may instruct the processor to execute a function of generating a first file, which corresponds to the read image, in a first file format when the processor determines that the read image comprises the table image. The computer-readable instructions may instruct the processor to execute a function of generating a second file, which corresponds to the read image, in a second file format when the processor determines that the read image does not comprise the table image. The second file may be different from the first file. The second file format may be different from the first file format.

A control device disclosed herein may be configured to process images read by a reading device. The control device may comprise a processor and a memory. The memory may be configured to store computer-readable instructions therein. The computer-readable instructions may instruct the processor to perform a function of determining whether a read image comprises a table image comprising a plurality of cell images arranged in one or more of rows and columns. The computer-readable instructions may instruct the processor to perform a function of generating a first file, which corresponds to the read image, in a first file format when the processor determines that the read image comprises the table image. The computer-readable instructions may instruct the processor to perform a function of generating a second file, which corresponds to the read image, in a second file format when the processor determines that the read image does not comprise the table image. The second file may be different from the first file. The second file format may be different from the first file format.

A method for processing images read by a reading device disclosed herein may comprise certain steps for processing the images. The method may comprise a step of determining whether a read image read by the reading device comprises a table image comprising a plurality of cell images arranged in one or more of rows and columns. The method may comprise a step of generating a first file, which corresponds to the read image, in a first file format when the read image comprises the table image. The method may comprise a step of generating a second file, which corresponds to the read image, in a second file format when the read image does not comprise the table image. The second file may be different from the first file. The second file format may be different from the first file format.

According to the foregoing embodiments, control devices may generate one or more files comprising one or more file formats based on one or more images read from one or more scanned documents. In the foregoing embodiments, the control devices may generate the one or more files comprising the one or more file formats based on one or more of: the presence of one or more table images comprised in the one or more images read from the one or more scanned documents, the absence of table images comprised in the one or more images read from the one or more scanned documents, the characteristics of table images comprised in the one or more images read from the one or more scanned documents, and other characteristics of the one or more images read from the one or more scanned documents.

According to the present invention, control devices, systems comprising control devices, computer-readable media comprising computer-readable instructions for control devices, methods for processing images, and related structures and functions for generating files in one or more of a plurality of file formats corresponding to read images on scanned documents are disclosed herein.

Other objects, features, and advantages will be apparent to persons of ordinary skill in the art from the following detailed description of embodiments of the invention and the accompanying drawings.

BRIEF DESCRIPTION OF THE DRAWINGS

For a more complete understanding of the present invention, needs satisfied thereby, and the objects, features, and advantages thereof, reference now is made to the following descriptions taken in connection with the accompanying drawings.

FIG. 6 is a flowchart of a portion of another scanning intermediate data generation process.

FIG. 7 is a flowchart of another portion of the other scanning intermediate data generation process.

DETAILED DESCRIPTION OF EMBODIMENTS OF THE INVENTION

Embodiments of the invention now are described with reference to the accompanying drawings. The invention may not be limited to the embodiments described below. Consequently, the invention may comprise various configurations of the technical ideas described herein. For example, portions of the embodiments described herein may be omitted, replaced, or augmented by features having configurations other than those described herein.

Figure 1:
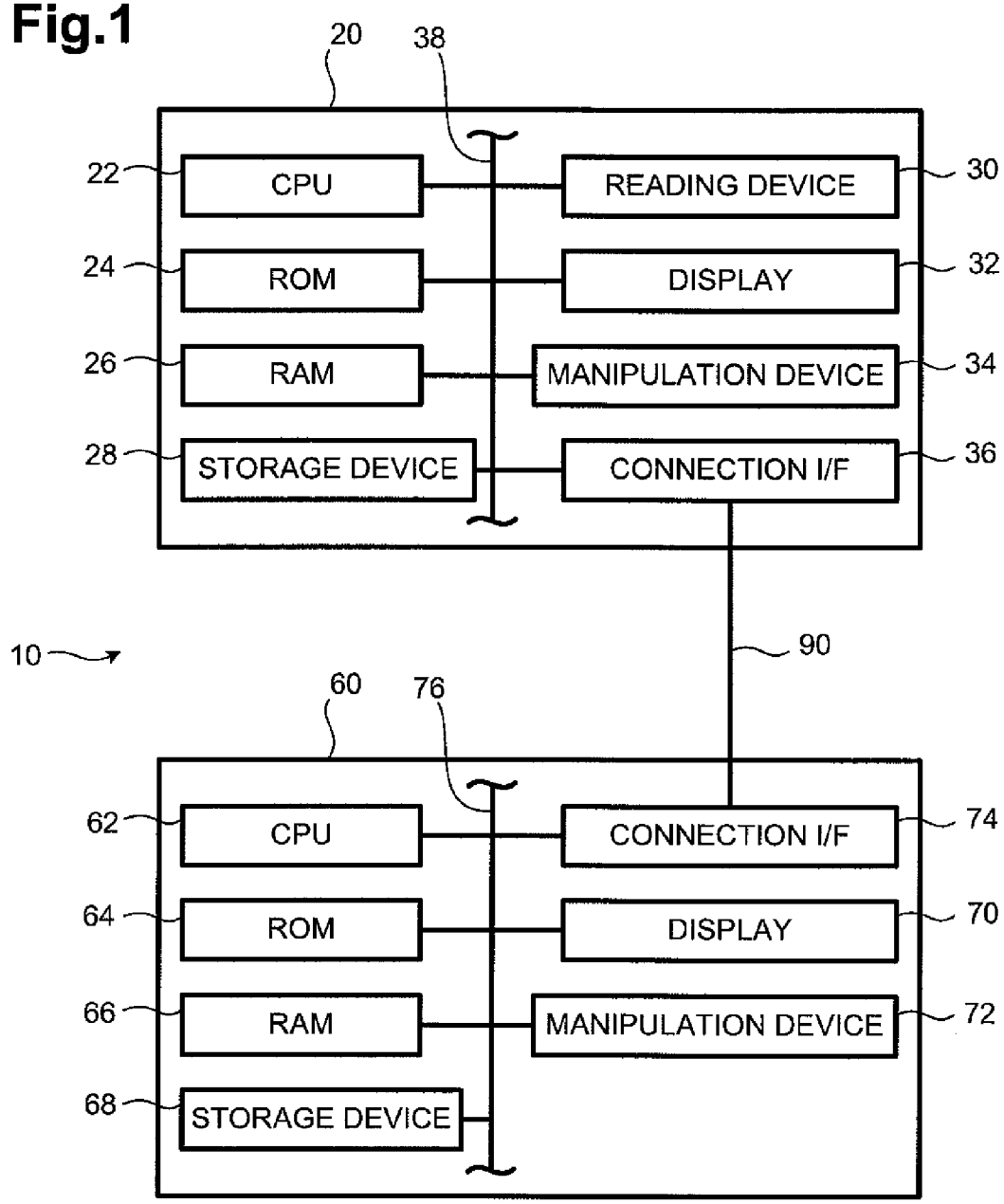
FIG. 1 is a block diagram depicting a configuration of a system comprising a scanner device and an information processing device.

As depicted in FIG. 1, a system 10 according to the present embodiment may comprise a scanner device 20 and an information processing device 60. The scanner device 20 and the information processing device 60 may connect to each other and may be configured to transmit and receive data via a communication cable 90. The scanner device 20 and the information processing device 60 may connect in an arbitrary manner. For example, when the devices are connected via a USB connection, the communication cable 90 may be a USB cable. When the devices are connected via a network connection, the communication cable 90 may be a LAN cable. The scanner device 20 and the information processing device 60 may connect wirelessly, such that the communication cable 90 is omitted from the system 10. The scanner device 20 may scan (e.g., read) a document and may generate a file (e.g., an electronic file) comprising an image corresponding to an image on the scanned document. The information processing device 60 may be, for example, a personal computer.

The scanner device 20 may generate files of various file formats corresponding to images on scanned documents. Such file formats are described below. For example, the scanner device 20 may generate a file in a format associated with spreadsheet application software. Hereinafter, spreadsheet application software may be referred to as "spreadsheet software." The format of a file associated with spreadsheet software may be referred to as "spreadsheet format," and a file in the spreadsheet format may be referred to as a "spreadsheet file." The spreadsheet format may have a data structure divided into units of worksheets. Thus, the spreadsheet file may comprise at least one worksheet. Each worksheet may comprise a plurality of cell areas, which may be arranged in rows, columns, or both. An example of the above-described spreadsheet software may be Excel® spreadsheet software sold by Microsoft Corporation (Excel® is a registered trademark of Microsoft Corporation of Redmond, Wash.).

The scanner device 20 may generate a file in a format associated with an application for creating documents. Hereinafter, application software for creating documents may be referred to as "word processing software." The format of a file associated with word processing software may be referred to as "word processor format," and a file in the word processor format may be referred to as a "word processor file." The word processor format may have a data structure divided into units of pages. Thus, a word processor file may comprise at least one page. An example of the above-described word processing software may be Microsoft® Word software sold by Microsoft Corporation (Microsoft® is a registered trademark of Microsoft Corporation of Redmond, Wash.). The word processing software may insert a table into a page of a word processor file.

The scanner device 20 may generate, for example, image files in a Tagged Image File Format ("TIFF"), a Portable Document Format ("PDF"), a bitmap format, and a Joint Photo Graphic Experts Group ("JPEG") format. TIFF files and PDF files, for example, may have a data structure divided into units of pages. Thus, image files formatted as a TIFF file or a PDF file may comprise at least one page. Hereinafter, an image file may be described with reference to a PDF file and the file format of the PDF file may be referred to as "PDF format."

In the present embodiments, each of the spreadsheet file, the word processor file, and the image file may comprise a file corresponding to one or more images on one or more documents scanned by the scanner device 20; therefore, the spreadsheet file, the word processor file, and the image file may be referred to collectively as, for example, "image files" (e.g., read image files). The term: "image files" may refer to image files in, for example, the bitmap format; however, the term: "image files," as used herein may correspond to a file comprising one or more read images from a scanned document, which has a wider scope than the common definition.

Hardware Configuration of Scanner Device

The scanner device 20 may comprise, for example, a central processing unit ("CPU") 22, a read-only memory ("ROM") 24, a random-access memory ("RAM") 26, a storage device 28, a reading device 30, a display 32, a manipulation device 34, and a connection interface ("connection I/F") 36, as depicted in FIG. 1. The components 22, 24, 26, 28, 30, 32, 34, and 36 may connect to a bus line 38.

The CPU 22 may execute processing operations. The ROM 24 may store computer-readable instructions therein. The computer-readable instructions stored in the ROM 24 may comprise, for example, computer-readable instructions for executing a main process (depicted in FIG. 2 and described below) and computer-readable instructions for executing a scanning intermediate data generation process (depicted in FIG. 5 or FIGS. 6 and 7 and described below). The CPU 22 may utilize the RAM 26 when executing the computer-readable instructions. The CPU 22 may execute, for example, the computer-readable instructions stored in the ROM 24, while utilizing the RAM 26, to control the scanner device 20. Thus, the scanner device 20 may implement various processes and functions.

The storage device 28 may comprise, for example, flash memory. The flash memory of the storage device 28 may store an image file as the final file (step S124 of FIG. 2, which is described below) generated by the scanner device 20. The reading device 30 may comprise a scanning mechanism, such as a Contact Image Sensor ("CIS") and a Charge Coupled Device ("CCD"). The reading device 30 may scan a document. The display 32 may comprise, for example, a liquid crystal display ("LCD") and may display various pieces of information (e.g., images). The manipulation device 34 may comprise one or more keys. For example, a user may manipulate one or more of the keys comprised by the manipulation device 34, and the user may input predetermined instructions into the scanner device 20. The connection I/F 36 may comprise, for example, a local connection I/F, such as USB connection, and a network I/F. In a wired connection configuration, the connection I/F 36 may comprise a connection port, which may connect to the communication cable 90 and which may communicate data to the information processing device 60, which also connects to the communication cable 90.

Hardware Configuration of Information Processing Device

As depicted in FIG. 1, the information processing device 60 may comprise, for example, a CPU 62, a ROM 64, a RAM 66, a storage device 68, a display 70, a manipulation device 72, and a connection I/F 74. The components 62, 64, 66, 68, 70, 72, and 74 may connect to a bus line 76.

The CPU 62, the ROM 64, and the RAM 66 may be configured similarly to the CPU 22, the ROM 24, and the RAM 26 of the scanner device 20, as described above. Therefore, description of components 62, 64, and 66 is omitted herein. The storage device 68 may comprise, for example, a hard disk. Computer-readable instructions, which may instruct the information processing device 60 to perform various processes, may be stored in the storage device 68. For example, spreadsheet software for a spreadsheet file, word processing software for a word processor file, and viewer software for a PDF file generated in a main process (depicted in FIG. 2 and described below) may be installed in the information processing device 60 and stored in the storage device 68. Computer-readable instructions for operating and controlling the scanner device 20 (e.g., a driver program) may be installed in the information processing device 60 and stored in the storage device 68. In certain embodiments, such as "Modification (1)" (described below), the storage device 68 may store computer-readable instructions, which may instruct the information processing device 60 to perform each of the processes depicted in one or more of FIGS. 2, 5, 6, and 7 (described below). The CPU 62 may execute the computer-readable instructions stored in the storage device 68, while utilizing the RAM 66, to control the information processing device 60. Thus, the information processing device 60 may implement various processes and functions.

The display 70 may comprise, for example, a LCD, and the display 70 may display various pieces of information. The manipulation device 72 may comprise, for example, a keyboard and a mouse. A user may manipulate the manipulation device 72 to input predetermined instructions into the information processing device 60. The connection I/F 74 may be configured similarly to the connection I/F 36, which may be comprised in the scanner device 20. Therefore, a description of the connection I/F 74 is omitted.

Main Process

A main process executed in the scanner device 20 is described with reference to FIG. 2 and other drawings. A user may initiate the main process, for example, by inputting an instruction to initiate the main process through the manipulation device 34. Alternatively, the information processing device 60 may initiate the main process by issuing an instruction to initiate the main process via the connection I/F 36. When the main process initiates, the CPU 22 may control the reading device 30 and may execute a scanning process, in which the scanner device 20 may scan a document placed therein (step S100). During the scanning process, the CPU 22 may generate a digital image based on an image read from the document (e.g., a read image) during scanning. Subsequently, the CPU 22 may determine whether the document being scanned is a first document among one or more documents placed in the scanner device 20 (step S102).

When the CPU 22 determines that the document being scanned is the first document (step S102:Yes), the CPU 22 may analyze the digital image, which represents the read image from the document scanned in step S100, and may detect straight lines in the read image (step S104). An example digital image format may be the bitmap format. The CPU 22 subsequently may determine whether the CPU 22 detected a straight line (step S106). When the CPU 22 determines that the CPU 22 detected a straight line (step S106: Yes), the CPU 22 may determine whether the detected straight line comprises a table (e.g., a table image) (step S108). The CPU 22 subsequently may determine whether the CPU 22 detected a table (step S110).

In step S108, the CPU 22 may determine, for example, whether the CPU 22 detected a plurality of straight lines (e.g., straight lines 102) extending in a first direction (e.g., a row direction depicted in FIGS. 3 and 4) and a plurality of straight lines (e.g., straight lines 104) extending in a second direction perpendicular to the first direction (e.g., a column direction in FIGS. 3 and 4) in S104. When the CPU 22 determines that the CPU 22 detected a plurality of straight lines extending in the first direction and a plurality of straight lines extending in the second direction, the CPU 22 may analyze the digital image of the read image to determine whether a plurality of the straight lines extending in the first direction and a plurality of the straight lines extending in the second direction intersect one another. When the CPU 22 determines that a plurality of the straight lines extending in the first direction and a plurality of the straight lines extending in the second direction intersect one another, the CPU 22 may determine that a structure, in which a plurality of cell images are arranged in rows and columns, is detected.

Figure 3:
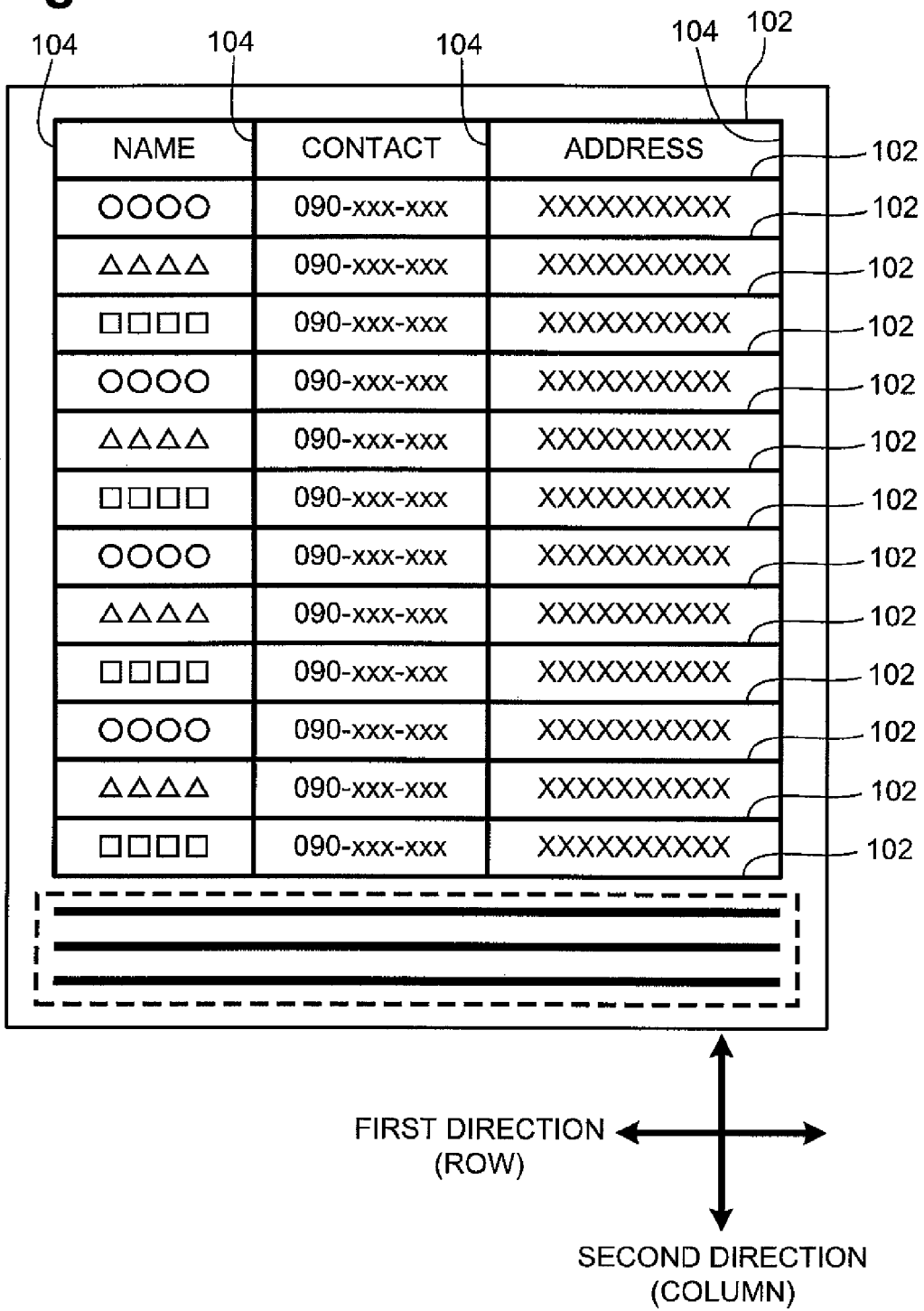
FIG. 3 depicts a read image on an original document, in which a size of a table (e.g., a table image), with respect to a page, is greater than or equal to 50% of a size of a page comprising the table.
Figure 4:
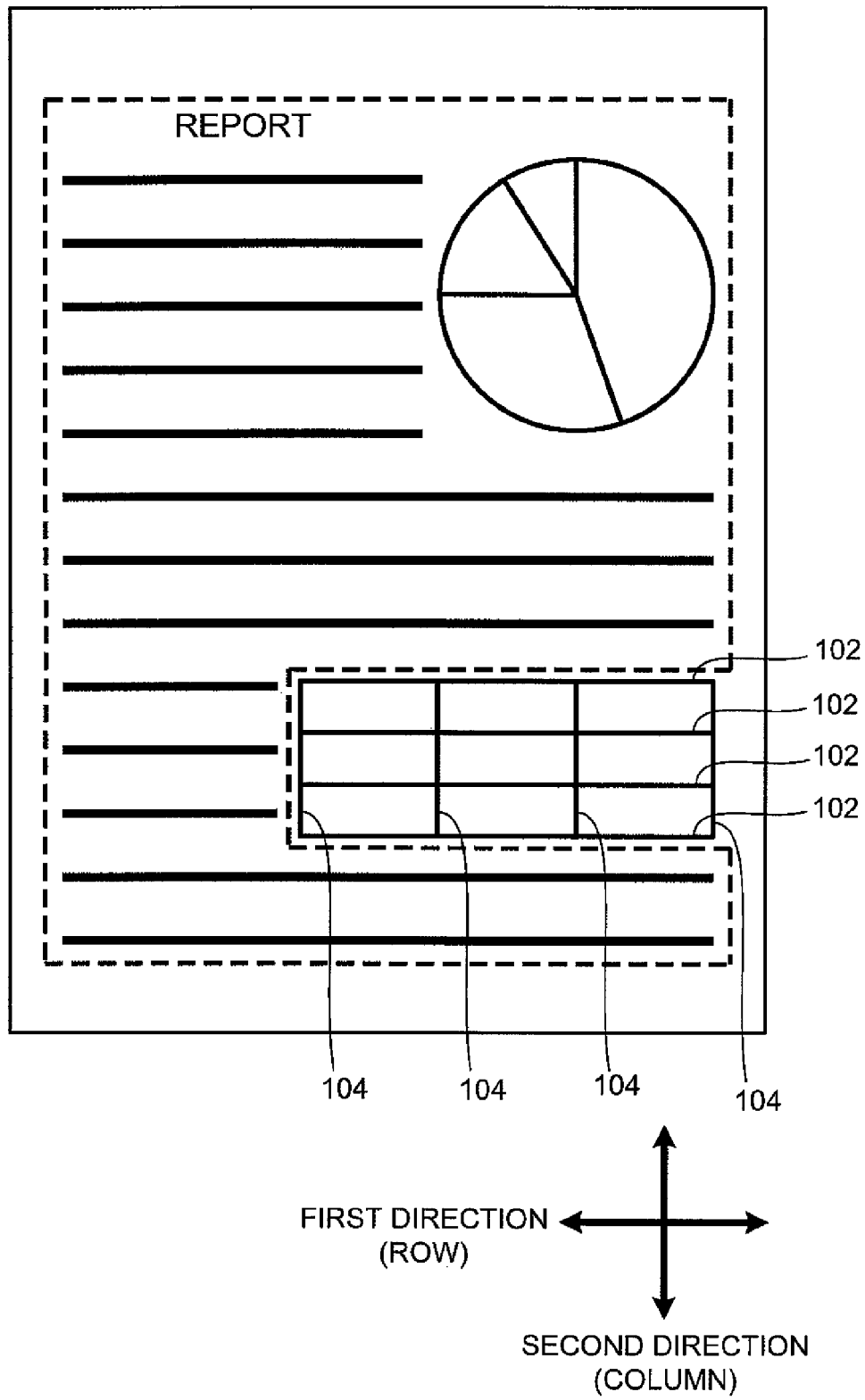
FIG. 4 depicts a read image on an original document, in which the size of a table (e.g., a table image), with respect to a page, is less than 50% of a size of a page comprising the table.

When the CPU 22 determines that a structure, in which a plurality of cell images are arranged in rows and columns, is detected, the CPU 22 may determine that a table is found, and the CPU 22 may make an affirmative determination in step S110 (step S110:Yes). For example, when the read image is similar to one or more of the images depicted in FIGS. 3 and 4, the CPU 22 may make an affirmative determination in step S110 (step S110:Yes). Although FIGS. 3 and 4 depict configurations in which the CPU 22 may make an affirmative determination in step S110, the CPU 22 may make an affirmative determination in step S110 when the read image comprises alternative configurations. As depicted in FIG. 3, the read image may comprise cell images comprising rectangular frame areas. For example, some of the rectangular frame areas may comprise item names comprising one of: "NAME," "CONTACT," and "ADDRESS," and others of the rectangular frame areas may comprise information corresponding to each of the items associated with a corresponding item name. As depicted in FIG. 3, the read table may comprise 39 cell images (e.g., 13 rows by 3 columns). As depicted in FIG. 4, the read image may comprise cell images comprising 9 unfilled, rectangular frame areas (e.g., 3 rows by 3 columns).

When the CPU 22 determines that a structure, in which a plurality of cell images are arranged in rows and columns, is not detected, the CPU 22 may determine that no table is found, and the CPU 22 may make a negative determination in step S110 (step S110:No). When the CPU 22 determines that the CPU 22 did not detect a plurality of straight lines extending in the first direction and a plurality of straight lines extending in the second direction, the CPU 22 may make a negative determination in step S110 (step S110:No).

When the CPU 22 makes an affirmative determination in step S110 (step S110:Yes), the CPU 22 may determine whether a size of the detected table is greater than or equal to 50% of a size of the read image (step S112). For example, the CPU 22 may determine whether a size of the detected table is greater than or equal to 50% of a size of the read image by determining whether the size of the detected table (e.g., an area of the detected table or a quantity of height pixels and width pixels of the detected table) is greater than or equal to a predetermined reference value. When the size of the detected table is greater than or equal to the reference value, the CPU 22 may make an affirmative determination in step S112 (step S112:Yes). When the size of the detected table is less than the reference value, the CPU 22 may make a negative determination in step S112 (step S112:No).

Regarding the determination in step S112, when the read image is similar to the image depicted in FIG. 3, the CPU 22 may determine that the size of the detected table is greater than or equal to 50% of the size of the read image. Therefore, the CPU 22 may make an affirmative determination in step S112 (step S112:Yes). The dashed lines depicted in FIGS. 3 and 4 are provided only for the description given below and are not a part of the read image in FIGS. 3 and 4. The thick lines surrounded by the dashed lines in FIGS. 3 and 4 schematically represent characters. After the CPU 22 makes an affirmative determination in step S112 (step S112:Yes), the CPU 22 may execute the scanning intermediate data generation process according to step S114. In the scanning intermediate data generation process according to step S114, the CPU 22 may generate scanning intermediate data corresponding to the spreadsheet format. The scanning intermediate data generation process according to step S114 is described below in more detail. When the CPU 22 completes step S114, the CPU 22 may proceed to step S120.

Regarding the determination in step S112, when the read image is similar to the image depicted in FIG. 4, the CPU 22 may determine that the size of the detected table is less than 50% of the size of the read image. Therefore, the CPU 22 may make a negative determination in step S112 (step S112:No). After the CPU 22 makes a negative determination in step S112 (step S112:No), the CPU 22 may execute the scanning intermediate data generation process according to S116. In the scanning intermediate data generation process according to step S116, the CPU 22 may generate scanning intermediate data corresponding to the word processor format. The scanning intermediate data generation process according to step S116 is described below in more detail. When the CPU 22 completes step S116, the CPU 22 may proceed to step S120.

Negative determinations in steps S106 and S110 now are described. When the CPU 22 makes a negative determination in step S106 (step S106:No) or when the CPU 22 makes a negative determination in step S110 (step S110:No), the CPU 22 may proceed to step S118 and may generate scanning intermediate data corresponding to the PDF format from the digital image corresponding to the read image scanned during the current scanning event (e.g., the current process initiating from step S100). The CPU 22 may output (e.g., store in) the generated scanning intermediate data to a predetermined area on the RAM 26 (e.g., a storing process). When the CPU 22 completes step S118, the CPU 22 may proceed to step S120.

In step S120, the CPU 22 may determine whether the next document to be scanned is placed in the scanner device 20. The CPU 22 may make the determination in step S120 based on a signal from a sensor, which may be configured to detect documents (not depicted) placed in the scanner device 20 and which may be comprised in the scanner device 20. When the sensor detects another document, the CPU 22 may determine that the next document has been placed in the scanner device 20 (step S120:Yes), the CPU 22 may return the process to step S100, and the CPU 22 may initiate scanning of the next document placed in the scanner device 20 (step S100).

After returning to and re-executing step S100, the CPU 22 may execute step S102, as described above. In this case, the CPU 22 may make a negative determination in step S102 (step S102:No) because the CPU 22 is performing the current scanning event for the second or a subsequent document set in the scanner device 20. As described above, at the time of scanning the first document, the CPU 22 may specify the file format to be associated with the generated scanning intermediate data. The CPU 22 may convert the digital image corresponding to the read image on the second and subsequent documents scanned during the current main process into scanning intermediate data associated with file format specified at the time of scanning the first document, and the CPU 22 may add the scanning intermediate data corresponding to the second and subsequent documents after conversion to the already-generated scanning intermediate data (step S122).

When the CPU 22 makes a negative determination in step S102 (step S102:No), the CPU 22 may specify the same file format as that of the already generated scanning intermediate data without specifying a specific file format. The CPU 22 may convert digital images to the specified file format in step S122 using the same procedures used in steps S114, S116, and S118, as appropriate. When the CPU 22 completes step S122, the CPU 22 proceeds to step S120.

In step S122, when the CPU 22 specifies the file format as the spreadsheet format or the word processor format while scanning the first document, the CPU 22 may execute steps S104, S106, S108, and S110 while scanning the second and subsequent documents, and the CPU 22 may determine whether a table has been detected. Subsequently, the CPU 22 may execute the scanning intermediate data generation process according to an appropriate one of steps S114 and S116, and may generate scanning intermediate data corresponding to the specified file format and add the generated scanning intermediate data to the already-generated scanning intermediate data. When the CPU 22 specifies the file format as the PDF format while scanning the first document, the CPU 22 may generate scanning intermediate data corresponding to the PDF format in step S118 without executing steps S104, S106, S108, and S110 (e.g., without determining whether a table the CPU 22 detects a table) and add the generated scanning intermediate data to the already-generated scanning intermediate data.

A negative determination in step S120 now is described. When the CPU 22 determines that a subsequent document is not placed in the scanner device 20 (step S120:No) (e.g., all the documents set in the scanner device 20 have already been scanned), the CPU 22 may convert the scanning intermediate data, which corresponds to one or more read images, which each correspond to one of the scanned documents, output to the RAM 26 into a final file in the file format specified while scanning of the first original document (step S124). Thereafter, in step S124, the CPU 22 may store the final file in the storage device 28 as one of a spreadsheet file, a word processor file, and a PDF file based on the file format specified while scanning the first document. After executing step S124, the CPU 22 may terminate the main process.

The final file generated in step S124 now is described in detail. When the CPU 22 executes step S114, the CPU 22 may convert scanning intermediate data corresponding to the spreadsheet format into a spreadsheet file. When the scanner device 20 scans two or more documents, each digital image corresponding to a read image on each scanned document is stored in a separate worksheet comprised within a single spreadsheet file. When the CPU 22 executes step S116, the CPU 22 may convert scanning intermediate data corresponding to the word processor format into a word processor file. When the scanner device 20 scans two or more documents, each digital image corresponding to a read image on each scanned document is stored on a separate page of a single word processing file. When the CPU 22 executes step S118, the CPU 22 may convert scanning intermediate data corresponding to the PDF format into a PDF file. When the scanner device 20 scans two or more documents, each digital image corresponding to a read image on each scanned document is stored on a separate page of a single PDF file.

When the CPU 22 initiates the main process in response to an instruction from the information processing device 60, the CPU 22 may store the appropriate one of the spreadsheet file, the word processor file, and the PDF file in the storage device 68 of the information processing device 60 via the connection I/F 36 during step S124. In particular, the CPU 22 may send the appropriate one of the spreadsheet file, the word processor file, and the PDF file to the information processing device 60 via the connection I/F 36.

In the main process described above, the CPU 22 may determine whether the read image corresponding to the scanned document comprises a table (step S110). When the CPU 22 determines that the read image corresponding to the scanned document comprises a table (step S110:Yes), the CPU 22 may determine whether a size of the detected table is greater than or equal to 50% of a size of the read image (step S112). Based on the determination in step S112, the CPU 22 may specify an appropriate file format in accordance with the content of the read image corresponding to the first scanned document, and the CPU 22 may generate scanning intermediate data, which represents the read image, corresponding to the specified file format (steps S114, S116 and S118). The CPU 22 may generate a final file in the specified file format from the generated scanning intermediate data (step S124). For example, the user may display, print, and edit the generated final file using corresponding application software, which may be installed in the information processing device 60.

Scanning Intermediate Data Generation Process

Certain embodiments now are described regarding the scanning intermediate data generation process executed in steps S114 and S116 of the main process, as described with reference to FIG. 2 and other drawings. The scanning intermediate data generation process executed in step S114 and the scanning intermediate data generation process executed in step S116 are similar and involve similar procedures, except that the CPU 22 generates a different kind of scanning intermediate data in step S114 than in step S116. Thus, the CPU 22 may perform one or more of a scanning intermediate data generation process, according to a process depicted in FIG. 5, and a scanning intermediate data generation process, according to a process depicted in FIGS. 6 and 7, when executing one or more of steps S114 and S116. A difference in the kind of the scanning intermediate data may exist when there is at least one intermediate data corresponding to two or more of the file formats.

Figure 5:
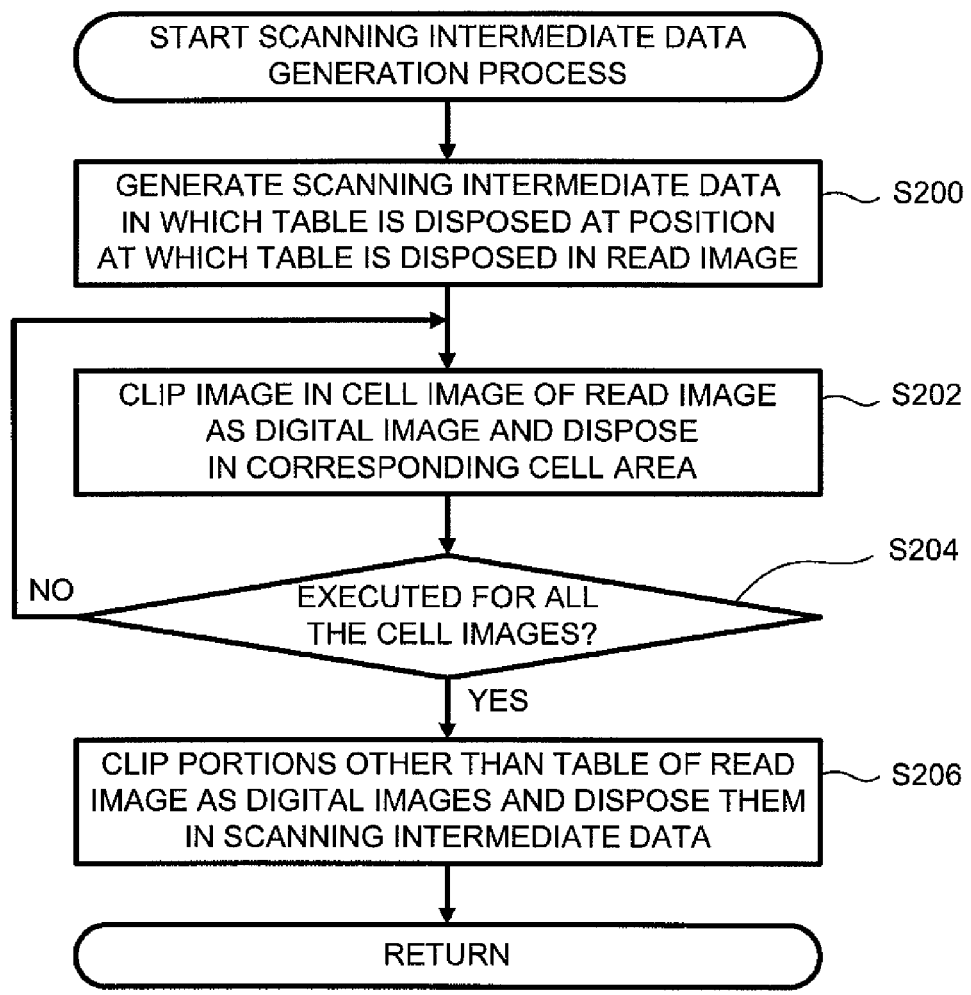
FIG. 5 is a flowchart of a scanning intermediate data generation process.

Scanning Intermediate Data Generation Process According to FIG. 5

Figure 2:
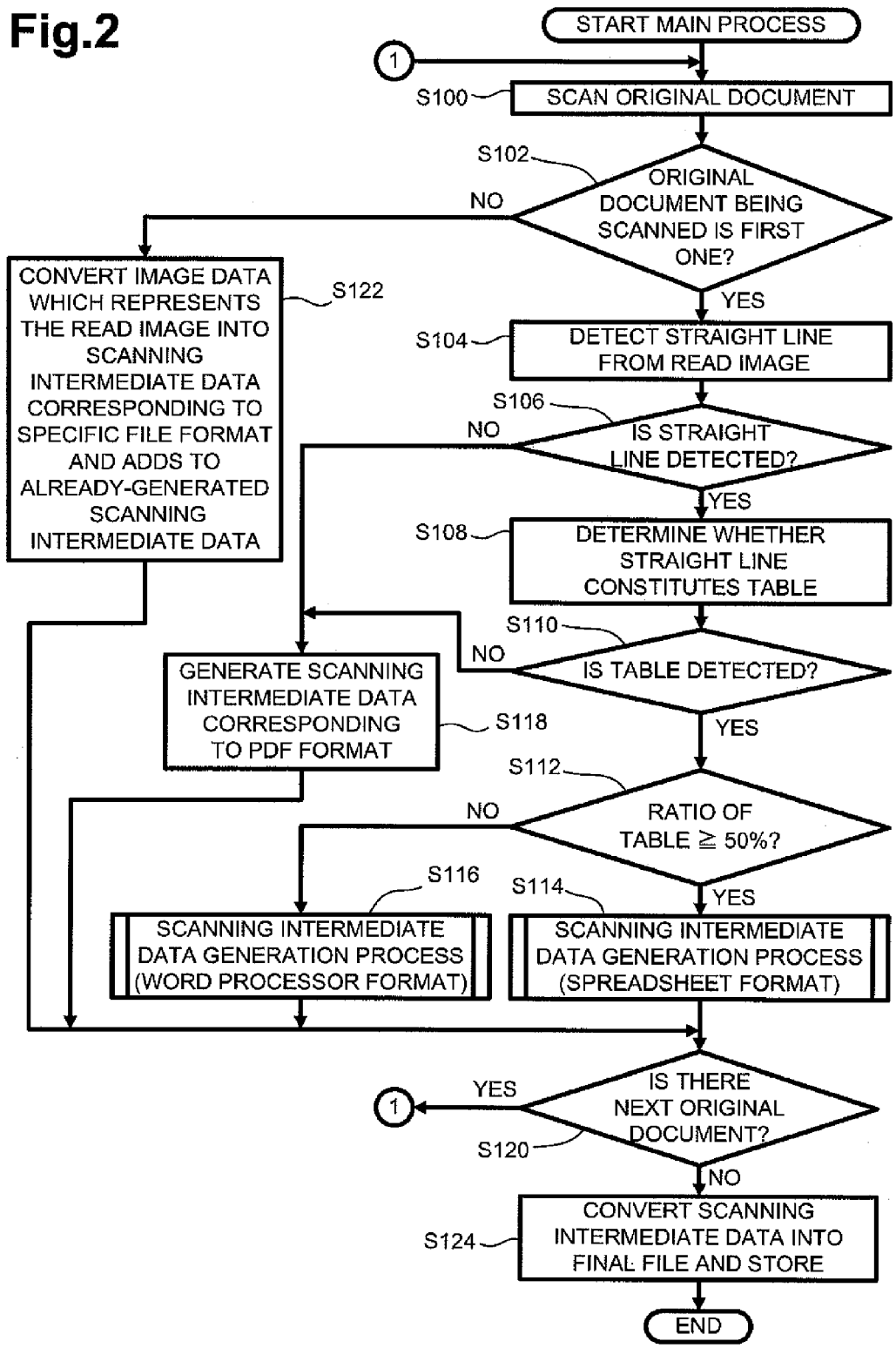
FIG. 2 is a flowchart of a main process.

When the CPU 22 performs one or more of steps S114 and S1116 of FIG. 2, the CPU 22 may generate scanning intermediate data representing a digital table disposed at a relative position in the digital image that is the same as a relative position of a corresponding table disposed in the read image (step S200). The scanning intermediate data generated in step S200 may be in the intermediate data format corresponding to the spreadsheet format when the CPU 22 executes the scanning intermediate data generation process in step S114 of FIG. 2; and the scanning intermediate data generated in step S200 may be in the intermediate data format corresponding to the word processor format when the CPU 22 executes the scanning intermediate data generation process in step S116 of FIG. 2. The digital table represented by the scanning intermediate data may comprise a structure in which cell areas may be arranged at relative positions that are the same as relative positions of corresponding cell images comprised in the read image. Thus, when the table comprised in the read image also comprises to a plurality of cell images arranged in rows and columns, the digital table represented by the scanning intermediate data may be arranged at the same relative position as the relative position of the table in the read image; and the digital table represented by the scanning intermediate data also may comprise a plurality of cell areas at the same relative positions as the relative positions of the cell images in the read image, and which are arranged in the same rows and columns as the rows and columns of the cell images in the read image. The cell areas may be filled with nothing (e.g., may be blank).

The table comprised in the read image may comprise a plurality of cell images. The CPU 22 may clip an image from a cell image in the read image as a clipped digital cell image (step S202). An example digital cell image format is bitmap data. In step S202, the CPU 22 may compile the digital table represented by the scanning intermediate data generated in step S200 and may dispose a clipped digital cell image in the cell area corresponding to the cell image from which the clipped digital cell image is clipped. The CPU 22 subsequently may determine whether the CPU 22 has executed step S202 for each cell image of the plurality of cell images (Ste [S204]. When the CPU 22 determines that one or more unprocessed cell images remain unprocessed (step S204:No), the CPU 22 may return the process to step S202 and may repeat step S202 for one of the one or more unprocessed cell image. When the CPU 22 determines that the CPU 22 has executed the process of step S202 for each of the cell images of the plurality of cell images (step S204:Yes), the CPU 22 may clip portions other than the table from the read image as clipped digital images and dispose the clipped digital images in the scanning intermediate data, such that clipped digital images are disposed at the same relative positions as the relative positions of the portions clipped from the read image (step S206).

For example, when the read image corresponds to one of FIG. 3 and FIG. 4, the CPU 22 may clip the portion surrounded by a dashed line in the one of FIG. 3 and FIG. 4 as a clipped digital image from the read image in step S206. An example clipped digital image format may be bitmap data. The CPU 22 subsequently may dispose the clipped digital image in the scanning intermediate data, such that a relative position of the clipped digital image corresponds to a relative position of the clipped portion in the read image (e.g., the position at which the dashed line is disposed in the read image). Referring to FIG. 3, for example, the read image may comprise the table depicted in the upper area, which is disposed above the area surrounded by the dashed line. In the present example, the read image may not comprise the image surrounded by the dashed line of FIG. 3. Thus, because the read image does not comprise portions other than the table, the CPU 22 may skip step S206.

After one or more of executing and skipping step S206, the CPU 22 may generate the scanning intermediate data, which may represent the read image on the document scanned in step S100 in the main process of FIG. 2. When the CPU 22 executes the scanning intermediate data generation process according to step S114 of FIG. 2, the CPU 22 may generate the scanning intermediate data corresponding to the spreadsheet format, which may represent the read image on the document scanned in step S100 of FIG. 2. When the CPU 22 executes the scanning intermediate data generation process according to step S116 of FIG. 2, the CPU 22 may generate the scanning intermediate data corresponding to the word processor format, which may represent the read image on the document scanned in step S100 of FIG. 2. After executing step S206, the CPU 22 may terminate the scanning intermediate data generation process according to FIG. 5 and may return the process to step S120 of the main process of FIG. 2.

With the scanning intermediate data generation process, according to FIG. 5 described above, the CPU 22 may clip the clipped digital cell image, which may correspond to the cell image in the table comprised in the read image on the scanned document, and the CPU 22 may dispose the digital clipped cell image in the cell area, which is in the same relative position in the digital image as the relative position of the cell image in the read image (step S202). Therefore, the CPU 22 may compile a digital table comprising cell areas, in which clipped digital cell images are disposed, and the CPU 22 may generate correctly the scanning intermediate data which comprises this table.

Scanning Intermediate Data Generation Process According to FIGS. 6 and 7

As described above, the CPU 22 may initiate a scanning intermediate data generation process depicted in FIGS. 6 and 7 during one or more of step S114 and step S116 of FIG. 2. During the scanning intermediate data generation process depicted in FIGS. 6 and 7, the CPU 22 may generate scanning intermediate data representing a digital table disposed at a relative position in the digital image that is the same as a relative position of a corresponding table in the read image (step S300). Step S300 may be the same as step S200 of FIG. 5. Therefore, a description of S300 is omitted herein.

The table comprised in the read image may comprise a plurality of cell images. After executing step S300, the CPU 22 may clip an image in a cell image as a clipped digital cell image. An example clipped digital cell image format may be bitmap data. The CPU 22 subsequently may acquire a histogram regarding the color of the clipped digital cell image (step S302). In step S302, the CPU 22 may analyze the color properties (e.g., gradation and hue) of each of pixel comprised in the clipped digital cell image. The CPU 22 subsequently may use the above-described color analysis to generate a histogram regarding the color of the clipped digital cell image. The histogram may comprise, for example, a horizontal axis for a component of color and a vertical axis for a number of pixels.

The CPU 22 subsequently may analyze the histogram acquired in step S302 and may determine whether the CPU 22 has detected a plurality of colors in the clipped digital cell image (step S304). In the determination of step S304, the CPU 22 may consider pixels comprising color components within a certain range as a same color. For example, when the color component is expressed in 255-level gradation, colors comprised in the range of about 5-level gradations from the center may be considered the same color. Such a configuration is discussed below. When there is a single color component or a plurality of colors that may be considered as a single color component that increases the number of pixels in the histogram acquired in step S302, the CPU 22 may make a negative determination in step S304 (step S304:No). When there are a plurality of color components, which increase the number of pixels, the CPU 22 may make an affirmative determination in step S304 (step S304:Yes). Each color comprised in the plurality of colors may be considered a single color.

When the CPU 22 makes a negative determination in step S304 (step S304:No), the CPU 22 may determine whether the single color component or the plurality of colors that may be considered a single color component analyzed in step S304 is white (step S306). When the color is white (step S306:Yes), the CPU 22 may proceed to step S322. In this case, the CPU 22 may not set white as a background color of the cell area, as the CPU 22 may do in step S308 (described below). Step S304 may be useful because spreadsheet software and word processing software often may have a white background. When the color is not white (step S306:No), the CPU 22 may detect a color other than white and may set the detected color as the background color of the cell area corresponding to the cell image to be processed (step S308). The CPU 22 may set the color that occupies the greatest area in the clipped digital cell image as the background color in the corresponding cell area. The color or colors that are considered a single color which occupies the greatest area comprising the color or the colors that are considered a single color in step S304 may be a specific color with the greatest number of pixels in the histogram. When the CPU 22 completes step S308, the CPU 22 may proceed to step S322.

An affirmative determination in step S304 now is described. When the CPU 22 makes an affirmative determination in step S304 (step S304:Yes), the CPU 22 may determine whether the plurality of colors analyzed in step S304 comprises two colors: black (e.g., black or colors considered as black) and a background color (e.g., colors considered as a single-colored background color) (step S310). When the CPU 22 determines that the plurality of colors does not comprise black, or that the plurality of colors comprises three or more colors (step S310:No), the CPU 22 may proceed to step S320. When the CPU 22 determines that the plurality of colors comprises two colors comprising black and a background color (step S310:Yes), the CPU 22 may perform image analysis of the black portion of the clipped digital cell image and may execute a black character determination process (step S312). The CPU 22 may execute the black character determination process to determine whether a portion of the color detected as black (e.g., the black portion) comprises characters.

The CPU 22 may determine whether the black portion of the clipped digital cell image comprises black characters based on the result of the black character determination process (step S314). When the black portion does not comprise black characters (step S314:No), the CPU 22 may proceed to step S320. When the black portion comprises black characters (step S314:Yes), the CPU 22 may execute an OCR process for the portion of the black portion determined to be black characters and may set text data representing the detected black characters as the cell area corresponding to the cell image to be processed (step S316).

The CPU 22 subsequently may set the color detected as the background color to the cell area in which the CPU 22 has set the text data (step S318). As the background color, the CPU 22 may set the color which occupies the greatest area in the clipped digital cell image clipped from the cell image excluding black associated with characters. The color which occupies the greatest area may be a specific color with the greatest number of pixels in the histogram. When the CPU 22 determines that white is the specific color with the greatest number of pixels in the histogram (e.g., the CPU 22 sets white as the background color), the CPU 22 may execute the same process that the CPU 22 executes when the CPU 22 makes an affirmative determination in step S306 (step S306:Yes). The color detected as white comprises the color generally considered to be white. When the CPU 22 completes step S318, the CPU 22 may proceed to step S322.

When the CPU 22 makes a negative determination in one or more of step S310 (step S310:No) and step S314 is denied (step S314:No), the CPU 22 may proceed to step S320, in which the CPU 22 may dispose the clipped digital cell image clipped in step S302 in the cell areas to be processed (step S320). When the CPU 22 completes step S320, the CPU 22 may proceed to step S322.

In step S322, the CPU 22 may determine whether the CPU 22 has executed the above-described processes (e.g., steps S300, S302, S304, S306, S308, S310, S312, S314, S316, S318, and S320) for each of the cell images comprised in the table of the read image (step S322). When the CPU 22 determines that one or more unprocessed cell images remain (step S322:No), the CPU 22 may return to step S302 and may repeat step 302 and the appropriate processes thereafter one of the one or more unprocessed cell images. When the CPU 22 determines that no unprocessed cell images remain (step S322:Yes), the CPU 22 may proceed to step S324 of FIG. 7.

In step S324 of FIG. 7, the CPU 22 may determine whether the file format associated with the scanning intermediate data is the spreadsheet format. The CPU 22 may make this determination based on the scanning intermediate data generated in step S300. The file format associated with the scanning intermediate data generated in step S300 may be a spreadsheet format when the CPU 22 executes the scanning intermediate data generation process according to step S114 of FIG. 2. The file format associated with the scanning intermediate data generated in step S300 may be a word processor format when the CPU 22 executes the scanning intermediate data generation process according to step S116 of FIG. 2.

When the file format associated with the scanning intermediate data is the spreadsheet format (step S324:Yes), the CPU 22 may clip portions other than the table from the read image as clipped digital images. An example clipped digital image format may be bitmap data. The CPU 22 subsequently may dispose clipped digital images in the corresponding cell areas represented by the scanning intermediate data, such that the clipped digital images are disposed at the same relative positions in the digital image as the relative positions of the portions clipped from the read image. In this manner, the CPU 22 may generate the scanning intermediate data associated with the spreadsheet format, which represents the read image on the document scanned in step S100 of FIG. 2. The process performed in step S326 may be similar to the process performed in step S206 of FIG. 5. Therefore, a specific description of step S326 is omitted herein.

When the file format associated with the scanning intermediate data is not the spreadsheet format, but rather is the word processor format (step S324:No), the CPU 22 may clip portions from the read image other than the table as clipped digital images. An example clipped digital image format may be bitmap data. The CPU 22 subsequently may execute the OCR process on the clipped digital images and may acquire text data. The CPU 22 may dispose text represented by the acquired text data at a relative position in the digital image corresponding to the relative position of the portion clipped from the read image. In this manner, the CPU 22 may generate the scanning intermediate data associated with the word processor format that represents the read image on the document scanned in step S100 of FIG. 2.

For example, when the read image is one as depicted in FIG. 4, the CPU 22 may clip a portion surrounded by the dashed line in FIG. 4 as a clipped digital image from the read image, and the CPU 22 may execute the OCR process for the portions recognized as characters (e.g., the portions where characters of "report" are found and the portions of "thick lines" that represent characters in FIG. 4) in step S328. The CPU 22 subsequently may dispose text represented by the acquired text data at a relative position in the digital image corresponding to the relative position of the portion clipped from the read image. The CPU 22 may clip the portion comprising the circle graph in FIG. 4 as a clipped digital image and may add the clipped digital image to the scanning intermediate data, such that the clipped digital image may be disposed at a relative position corresponding to the relative position of the portion comprising the circle graph clipped from the read image. After executing one or more of step S326 and step S328, the CPU 22 may terminate the scanning intermediate data generation process according to FIGS. 6 and 7, and the CPU 22 may return to step S120 of the main process of the FIG. 3.

In the scanning intermediate data generation process according to FIGS. 6 and 7, when characters (e.g., black characters) are comprised in the table comprised in the read image on the scanned document (step S314:Yes in FIG. 6), the CPU 22 may convert the black characters into text data (step S316 of FIG. 6). The CPU 22 may generate the scanning intermediate data in which text represented by the text data is disposed in the cell areas (steps S326 and S328 of FIG. 7). According to whether the CPU 22 generates a spreadsheet file or a word processor file as the final file from the scanning intermediate data, a user may re-edit or re-use the characters (e.g., the text data) in the cell areas of the table using spreadsheet software or word processing software, based on the file format of the final file. Therefore, the CPU 22 may generate a final file.

Modifications

Certain embodiments may be implemented in the following configuration. Modifications described below also may implement functions similar to those of the configurations described above and may provide the same effect.

(1) In the above description, the CPU 22 may execute the main process (see FIG. 2) comprising the scanning intermediate data generation process (see FIG. 5 or FIGS. 6 and 7) in the scanner device 20. Such a process, which may comprise a case in which modifications (2) to (5) described below are adopted, may be executed by the information processing device 60 connected to the scanner device 20. In this case, the CPU 62 of the information processing device 60 may send an operation instruction to operate the scanner device 20 via the connection I/F 74 at the start of step S100 of FIG. 2. The scanner device 20, which receives the operation instruction, may scan the document placed therein and may send a digital image, which represents the read image on the scanned document, to the information processing device 60 via the connection I/F 36. The information processing device 60 may receive the digital image, which represents the read image sent from the scanner device 20, via the connection I/F 74.

The CPU 62 may execute one or more of steps S104, S106, S108, S110, S112, S114, S116, and S118 of FIG. 2 based on the received digital image, which represents the read image, and may generate scanning intermediate data corresponding to one or more of the spreadsheet format, the word processor format, and the PDF format (steps S114, S116, and S118 of FIG. 2). The CPU 62 successively may receive digital images, which represent the read image on the second and subsequent documents, and may add the received digital images to the already-generated scanning intermediate data (step S122 of FIG. 2). When the CPU 62 makes a negative determination in step S120 of FIG. 2 (step S120:No), the CPU 62 may generate the final file, which may be one of a spreadsheet file, a word processor file, and a PDF file (step S124 of FIG. 2).

(2) In the scanning intermediate data generation process according to FIGS. 6 and 7 described above, when the CPU 22 detects a table in the read image on the scanned document (step S110:Yes in FIG. 2) and detects characters (e.g., black characters) in the cell images of the detected table (steps S312 and S314 of FIG. 6), the CPU 22 may dispose text, which may be represented by the text data acquired in the OCR process, in the cell areas corresponding to the cell image (step S316 of FIG. 6). In certain embodiments, when the CPU 22 detects the characters, the CPU 22 may not dispose text, which may be represented by the text data, in the cell areas and may keep the cell areas blank. Therefore, the CPU 22 may omit step S316 of FIG. 6 from the scanning intermediate data generation process. Accordingly, the CPU 22 may generate the final file, which corresponds to the read image on the scanned document and which may comprise cell areas without text disposed therein (steps S114, S116, and S124 of FIG. 2).

According to the above-described configuration, when the document to be scanned is a fill-in form having, for example, a predetermined layout format and characters or the like have already been filled in the cell images, the CPU 22 may generate one or more of a spreadsheet file and a word processor file comprising an unfilled table comprising blank cell areas. Such a configuration also may be adopted step S320 of FIG. 6. Accordingly, in the configuration described above, the cell areas in which an image in accordance with the digital cell image is disposed may be kept blank. When the user wants a new fill-in form, it may not be necessary to perform an operation to, for example, erase the characters already-filled on the recording sheet. Consequently, printing the thus-generated spreadsheet file by spreadsheet software or printing the thus-generated word processor file by word processing software may provide a new, unfilled fill-in form.

The above-described configuration may be adopted in step S320, rather than in step S316. In this configuration, text in the cell areas, which the CPU 22 determines comprise characters therein during the OCR process, may be retained and the remaining cell areas may be left blank. In an example case of a device which executes the OCR process with precision, the device may recognize characters printed by, for example, a printer as characters, and the device may not recognize, for example, handwritten characters as characters. The device may generate one or more of a spreadsheet file and a word processor file, which may comprise an unfilled table constituted by the blank cell areas (e.g., handwritten areas and empty areas), such that the one or more of the spreadsheet file and the word processor file is a fill-in form filled with predetermined characters printed by, for example, a printer.

(3) In the scanning intermediate data generation process according to FIGS. 6 and 7, the CPU 22 may execute the OCR process for a clipped digital cell image, which may represent an image in the cell image clipped during step S302 of FIG. 6, corresponding to each of the cell images comprised in the table comprised in the read image on the scanned document (step S316 of FIG. 6). Alternatively, the CPU 22 may execute the OCR process and the text data may be acquired in advance from the digital image, which represents the entire read image. Accordingly, the CPU 22 may not execute the OCR process in step S316 of FIG. 6. In step S316, text data, which represents characters disposed at a relative position of the cell image to be processed, may be specified on the basis of the previously acquired text data. The CPU 22 may dispose specified text represented by the specified text data in the cell area that corresponds to the cell image to be processed.

(4) In the discussion of the scanning intermediate data generation process according to FIGS. 6 and 7, the CPU 22 may determine whether black characters are present (steps S310, S312, and S314 of FIG. 6). A color other than black, or a plurality of colors comprising a specific color, such as black, may be used for the character determination process.

(5) step S326 of FIG. 7 in the scanning intermediate data generation process according to FIGS. 6 and 7 may be similar to step S328. In this case, the CPU 22 may execute the OCR process for the portions other than the table of the read image in step S326 in the same manner as the CPU 22 executes the OCR process in step S328 to acquire text data. The CPU 22 subsequently may dispose text, which may be represented by the acquired text data, at cell areas in the scanning intermediate data that are not comprised by a digital table corresponding to a table in the read image, such that the text is disposed at a relative position in the digital image corresponding to the relative positions at which the portions other than the table are disposed in the read image.

(6) In the above description, when a table is detected in the digital image, which may represent the read image on the document, the CPU 22 may generate the final file in one or more of the spreadsheet format and the word processor format; and when the CPU 22 does not detect a table, the CPU 22 may generate the final file in the PDF format. Nevertheless, in certain embodiments, the CPU 22 may not specify the format of the final file as described in the configurations above. For example, when a table is detected, the CPU 22 may generate the image file as a final file in the PDF format; and, when the CPU 22 does not detect a table, the CPU 22 may generate the final file in one or more of the spreadsheet format and the word processor format.

Example Correlations of Terminology

The control device may be comprised by the CPU 22, the ROM 24 (e.g., computer-readable instructions stored in the ROM 24), and the RAM 26 of in the scanner device 20. The control device may be comprised by the CPU 62, the storage device 68 (e.g., computer-readable instructions stored in the storage device 68), and the RAM 66 of the information processing device 60. The spreadsheet file and the word processor file, among others, may correspond to a first file in the first file format. In particular, the spreadsheet file may correspond to a first file of a first kind in the first file format of a first kind. The word processor file may correspond to a first file of a second kind in a first file format of a second kind. An image file, such as the PDF file, may correspond to a second file in a second file format.

The processes executed in steps S104, S106, S108, and S110 of FIG. 2 may correspond "specifying" processes. The processes executed in steps S114 and S116 of FIG. 2 and described with respect to FIGS. 5, 6, and 7, and the processes executed in steps S118, S122, and S124 may correspond to "generating" processes. The process executed in S112 of FIG. 2 may correspond to a process of "determining whether a size of the table image being specified is greater than a size of a predetermined area." The process executed in steps S312 and S314 of FIG. 6 may correspond to a process of "determining whether the cell image of the table image being specified is a character." The processes executed in steps S304, S306, and S310 of FIG. 6 may correspond to a process of "determining an area in the cell image of the table image being specified of a greatest size depicted in substantially the same color."

While the invention has been described in connection with various example structures and illustrative embodiments, it will be understood by those skilled in the art that other variations and modifications of the structures, configurations, and embodiments described above may be made without departing from the scope of the invention. For example, this application comprises any possible combination of the various elements and limitations disclosed herein, and the particular elements and features presented in the claims and disclosed above may be combined with each other in other ways within the scope of the application, such that the application should be recognized as also directed to other embodiments comprising any other possible combinations. Other structures, configurations, and embodiments will be apparent to those skilled in the art from a consideration of the specification or practice of the invention disclosed herein. It is intended that the specification and the described examples are illustrative with the true scope of the invention being defined by the following claims.

What is claimed is:

1. A system comprising:
a reading device configured to read an image from a document; and
a control device configured to control the reading device, wherein the control device comprises:
a processor; and
a memory configured to store computer-readable instructions therein, the computer-readable instructions instructing the processor to perform functions comprising:
determining whether a read image read by the reading device comprises a table image comprising a plurality of cell images arranged in one or more of rows and columns;
generating a first file, which corresponds to the read image, in a first file format when the processor determines that the read image comprises the table image; and
generating a second file, which corresponds to the read image, in a second file format when the processor determines that the read image does not comprise the table image,
wherein the second file is different from the first file, and
wherein the second file format is different from the first file format.

2. The system according to claim 1,
wherein the first file format is a file format comprising a table structure that comprises a plurality of cell areas arranged in one or more of rows and columns, and
wherein the computer-readable instructions instruct the processor to perform functions further comprising:
generating the first file in the first file format when the processor determines that the read image comprises the table image, such that each cell image of the plurality of cell images is disposed in a corresponding cell area of the plurality of cell areas.

3. The system according to claim 1, wherein the computer-readable instructions instruct the processor to perform functions further comprising:

generating a first kind of the first file in a first kind of the first file format when the processor determines that the read image comprises the table image and a size of the table image is greater than or equal to a size of a predetermined area; and
generating a second kind of the first file in a second kind of the first file format when the processor determines that the read image comprises the table image and the size of the table image is less than the size of the predetermined area,
wherein the second kind of the first file is different from the first kind of the first file, and
wherein the second kind of the first file format is different from the first kind of the first file format.

4. The system according to claim 3, wherein the computer-readable instructions instruct the processor to perform functions comprising:
determining whether the size of the table image is greater than or equal to the size of the predetermined area when the processor determines that the read image comprises the table image.

5. The system according to claim 1,
wherein the first file format is a file format comprising a table structure that comprises a plurality of cell areas arranged in one or more of rows and columns, and
wherein the computer-readable instructions instruct the processor to perform functions further comprising:
generating the plurality of cell images as different digital images when the processor determines that the read image comprises the table image; and
generating the first file of the first file format when the processor determines that the read image comprises the table image, such that each of the different digital images is disposed in a corresponding cell area of the plurality of cell areas.

6. The system according to claim 1,
wherein the first file format is a file format comprising a table structure that comprises a plurality of cell areas arranged in the one or more of rows and columns;
wherein the computer-readable instructions instruct the processor to perform functions further comprising:
determining whether a cell image of the plurality of cell images comprised in the table image is a character when the processor determines that the read image comprises the table image;
generating the cell image as text when the processor determines that the cell image of the plurality of cell images comprised in the table image is a character and generating the first file in the first file format, such that the text is disposed in a cell area of the plurality of cell areas, which corresponds to the cell image; and
generating the cell image as a digital image when the processor determines that the cell image of the plurality of cell images comprised in the table image is not a character and generating the first file in the first file format, such that the digital image is disposed in a cell area of the plurality of cell areas, which corresponds to the cell image.

7. The system according to claim 1, wherein the computer-readable instructions instruct the processor to perform functions further comprising:
determining an area in a cell image of the plurality of cell images comprised in the table image of a greatest size depicted in substantially the same color when the processor determines that the read image comprises the table image; and generating the first file in the first file format comprising a table structure that comprises a plurality of cell areas arranged in one or more of rows and columns, such that a color corresponding to the substantially the same color is set as the background color in the cell area when the processor determines that the read image comprises the table image.

8. The system according to claim 1, wherein, when two or more documents are read by the reading device, the computer-readable instructions instruct the processor to perform functions further comprising:
generating the first file in the first file format when the processor determines that the read image from a first document read comprises the table image, wherein the first file in the first file format corresponds to a plurality of read images and each read image of the plurality of read images corresponds to a different one of the two or more documents; and
generating the second file in the second file format when the processor determines that the read image from the first document read does not comprise the table image, wherein the second file in the second file format corresponds to a plurality of read images and each read image of the plurality of read images corresponds to a different one of the two or more documents.

9. The system according to claim 1, wherein the computer-readable instructions instruct the processor to perform functions further comprising:
determining whether the read image comprises a substantially straight line; and
determining that the read image does not comprise the table image when the processor determines that the read image does not comprise the straight line.

10. The system according to claim 9, wherein the computer-readable instructions instruct the processor to perform functions further comprising:
determining whether the read image comprises a plurality of lines in a first direction and a plurality of lines in a second direction substantially perpendicular to the first direction when the processor determines that the read image comprises the substantially straight line;
determining that the read image does not comprise the table image when the processor determines that the read image does not comprise the plurality of lines in the first direction and the plurality of lines in the second direction.

11. The system according to claim 10, wherein the computer-readable instructions instruct the processor to perform functions further comprising:
determining whether three or more lines of the plurality of lines in the first direction intersect two or more lines of the plurality of lines in the second direction when the processor determines that the read image comprises the plurality of lines in the first direction and the plurality of lines in the second direction;
determining that the read image comprises the table image when the processor determines that the three or more lines of the plurality of lines in the first direction intersect the two or more lines of the plurality of lines in the second direction; and
determining that the read image does not comprise the table image when the processor determines that the three or more lines of the plurality of lines in the first direction do not intersect the two or more lines of the plurality of lines in the second direction.

12. A non-transitory, computer-readable storage medium storing computer-readable instructions executable by a processor of a control device configured to control a reading device, which is configured to read a document, the computer-readable instructions instructing the processor to execute functions comprising:
determining whether a read image comprises a table image comprising a plurality of cell images arranged in one or more of rows and columns;
generating a first file, which corresponds to the read image, in a first file format when the processor determines that the read image comprises the table image; and
generating a second file, which corresponds to the read image, in a second file format when the processor determines that the read image does not comprise the table image,
wherein the second file is different from the first file, and wherein the second file format is different from the first file format.

13. A control device configured to process images read by a reading device, wherein the control device comprises:
a processor; and
a memory configured to store computer-readable instructions therein, the computer-readable instructions instructing the control device to perform functions comprising:
determining whether a read image comprises a table image comprising a plurality of cell images arranged in one or more of rows and columns;
generating a first file, which corresponds to the read image, in a first file format when the processor determines that the read image comprises the table image; and
generating a second file, which corresponds to the read image, in a second file format when the processor determines that the read image does not comprise the table image,
wherein the second file is different from the first file, and wherein the second file format is different from the first file format.

* * * * *